United States Patent [19]

Fitch

[11] Patent Number: 5,279,779
[45] Date of Patent: Jan. 18, 1994

[54] HIGH ALUMINA INSULATING REFRACTORY PRODUCT AND METHOD FOR MAKING SAME

[75] Inventor: Lawrence D. Fitch, Bethel Park, Pa.

[73] Assignee: Indresco, Inc., Dallas, Tex.

[21] Appl. No.: 784,565

[22] Filed: Oct. 29, 1991

[51] Int. Cl.$^5$ ............................................. C04B 35/10
[52] U.S. Cl. ...................................... 264/63; 501/80; 501/127
[58] Field of Search ...................... 264/63; 501/127, 80

[56] References Cited

U.S. PATENT DOCUMENTS

| | | | |
|---|---|---|---|
| 2,463,979 | 3/1949 | Langrod | 501/127 |
| 3,284,218 | 11/1966 | King | 501/127 |
| 3,459,564 | 8/1969 | Lachman . | |
| 3,516,840 | 6/1970 | Gitzen et al. . | |
| 3,607,025 | 9/1971 | Jacobson . | |
| 4,495,301 | 1/1985 | Sutor . | |
| 4,678,762 | 4/1987 | Agarwal et al. . | |
| 4,874,726 | 10/1989 | Kleeb et al. . | |
| 4,879,260 | 11/1989 | Manning . | |
| 4,954,462 | 9/1990 | Wood et al. . | |

FOREIGN PATENT DOCUMENTS 2115132 10/1971 Fed. Rep. of Germany .

OTHER PUBLICATIONS

Product Announcement for Norton Company, "Insulating ALUNDUM Fused Alumina Bonded Shapes AN 599 and AN582".
Product Announcement for the Carborundum Company, "Alfrax 'Bubble' B101 Mix 8435 Fused Aluminum Oxide Refractory".

*Primary Examiner*—James Derrington
*Attorney, Agent, or Firm*—Arnold, White & Durkee

[57] ABSTRACT

The present invention provides an as-fired, high alumina, low silica, corrosion resistant, refractory product and a method for making said product where the product includes from about 50 wt. % to about 80 wt. % of a bubble alumina, from about 10 wt. % to about 30 wt. % of a fine calcined alumina and from about 5 wt. % to about 20 wt. % of a fine hydrated alumina. The product is characterized by having an alumina content of at least 98 wt. % alumina, a silica content of less than 1 wt. %, a density of from about 80 to about 95 pounds per cubic feet, a porosity of from about 55% to about 65%, a room temperature modulus of rupture of at least 200 psig and a cold crushing strength of from at least 200 psi.

10 Claims, No Drawings

HIGH ALUMINA INSULATING REFRACTORY PRODUCT AND METHOD FOR MAKING SAME

FIELD OF THE INVENTION

This invention relates to an improved relatively high alumina, low silica, corrosion resistant, insulating refractory product and a method for manufacturing said product.

BACKGROUND OF THE INVENTION

Refractories, such as bricks, used to line chemical incinerators usually are required to be resistant to high temperatures and to corrosive gases such as fluorine and hydrofluoric acid. Most refractories for these applications contain some type of silica or silica-containing material. Unfortunately, silica is subject to attack by the corrosive gases which cause silica to be leached through the formation of a gaseous silicon tetrafluoride, $SiF_4$. This problem is especially severe in insulating backup refractories which traditionally contain high levels of either free or reducible silica usually occurring in the form of a bonding clay.

One disadvantage of high alumina, low silica, insulating refractories is inadequate handling strength after dry pressing. Most conventional refractory mixtures with little or no silica, or silica-containing clay, are so weak that the mixtures cannot be dry pressed and fired into commercially usable shapes. The lack of adequate handling strength is particularly severe in relatively porous alumina refractories which have a low silica content.

U.S. Pat. No. 4,495,301 to Sutor discloses one attempt to produce a lightweight insulating alumina refractory having a low silica content. The composition includes the addition of "hollow spherical particles" of alumina. Although this patent describes a lightweight alumina refractory with a low silica content, the composition requires the addition of a calcium aluminate cement to achieve adequate handling strength. In fact, in Table II - continued (col. 3 and 5, lines 1-15) on the Sutor patent, when the calcium aluminate cement wt. % was reduced to 15 wt. %, the resulting refractory (J in the Sutor patent) had only a 60 psi room temperature modulus of rupture. A room temperature modulus of rupture of less than about 100 psig is indicative of a refractory which possesses inadequate handling strength.

One important use of insulating alumina refractories which have low silica contents is as backup refractory liners for incinerators. Typically, incinerators are equipped with both a primary and a secondary liner brick. The primary liner brick is exposed to the internal temperatures of the incinerator. The secondary, or backup liner brick is interposed between the primary brick and the outer walls of the incinerator and acts to insulate the outer walls from the internal temperatures of the incinerator. The primary brick is commonly composed of a relatively non-porous brick which has a relatively high thermal conductivity. On the other hand, relatively porous refractories are especially well suited as backup liners, because, in general, more porous materials are poorer thermal conductors, and, thus, make better insulators.

The need, therefore, exists to find an alumina insulating refractory essentially free of silica, yet that can be dry pressed and fired into usable shapes.

SUMMARY OF THE INVENTION

The present invention provides a method for manufacturing a high alumina, low silica, corrosion resistant, insulating refractory product, such as refractory brick, which includes the mixing from about 50 wt. % to about 80 wt. % of a bubble alumina, from about 10 wt. % to about 30 wt. % of a calcined alumina, from about 5 wt. % to about 20 wt. % of a hydrated alumina, and from about 1 wt. % to about 5 wt. % by weight of an organic binder in a mixer to produce a pre-pressed mixture.

The pre-pressed mixture is pressed into a shape at a sufficient forming pressure to form the shape such that the shape has a pre-fired density of from about 85 to about 110 pounds per cubic foot ("pcf"). The shape is then fired at a sufficient temperature and for a sufficient time to form a commercially usable refractory product.

The method of the present invention can further include the addition of from about 1% to about 5% of a tempering agent, preferably water, and of from about 0.5% to about 1.5% of a graphite added during the mixing operation.

The present invention also provides for a refractory product comprising: from about 50 wt. % to about 80 wt. % of a bubble alumina having an alumina content of at least 98 wt. % and a silica content of less than 1 wt. %; from about 10 wt. % to about 30 wt. % of a fine calcined alumina; and from about 5 wt. % to about 20 wt. % of a fine hydrated alumina, which refractory product is manufactured in accordance with the method described above.

The as-fired, high alumina, low silica, refractory products of the present invention are characterized by having: 1) a high alumina content of at least 98 wt. %; 2) a low silica content of less than 1 wt. %; 3) a density of from about 80 pcf to about 95 pcf; 4) a porosity of from about 55% to about 65%; and 5) a sufficient cold crushing strength to make the products commercially usable. Generally, the refractory products of the present invention may be manufactured to have a room temperature modulus of rupture of at least 200 psig and a cold crushing strength of at least 200 psig. Cold crushing strengths of at least 500 psig are preferred.

DESCRIPTION OF THE PREFERRED EMBODIMENT

Conventionally, silicas or silica-containing clays, or other silica-containing cementing materials are often added to high alumina insulating refractories to improve the cold crushing strength or handling strength of the refractories. However, in especially corrosive environments, like those encountered in incinerators which are exposed to hydrofluoric acid and/or fluorine gas, insulating refractories which contain siliceous materials deteriorate and can be rendered useless. Where the desire is to manufacture relatively porous alumina refractories (for example, a porosity of greater than 40%), the problems are further exacerbated. Porous alumina insulating refractories, once made, tend to have inadequate cold crushing strength. This inadequate cold crushing strength (generally less than 200 psig) is typically a direct result of the relatively high porosities.

In accordance with the present invention, high alumina, low silica, insulating refractories can be produced with adequate cold crushing strength from a pre-fired mixture including bubble alumina, fine calcined alumina, and fine hydrated alumina. Typically, the high alumina, low silica refractory products of the present invention have an alumina content of at least 98 wt. % and a silica content of less than 1 wt. %. The term "fine" relates to the particle size of the calcined and hydrated aluminas, and, in the present disclosure, is utilized to identify particles of 325 mesh or less.

Generally, the composition is manufactured by mixing the three aluminas with an organic binder together in a mixer to produce a pre-pressed mixture. The pre-pressed mixture is then pressed into a shape and fired. Optionally, the pre-pressed mixture can further include a tempering agent, preferably water, and a graphite.

A preferred implementation of the method for manufacturing the refractory products of the present invention includes the mixing of the bubble alumina and the organic binder to produce a first mixture. This first mixture is then mixed with the fine calcined alumina and the fine hydrated alumina to produce the pre-pressed mixture. This pre-pressed mixture is then pressed into a desired shape and fired.

In one particularly preferred implementation of the method for manufacturing the refractory products of the present invention, the bubble alumina and powdered organic binder are first mixed to produce a dry mixture. The optional tempering agent is then mixed with the dry mixture to produce a moistened mixture. This moistened mixture is then combined with the fine calcined alumina and the fine hydrated alumina with mixing to form the pre-pressed mixture. The pre-pressed mixture is then pressed into a shape and fired. Optionally, graphite can be added with the fine aluminas.

In a second particularly preferred implementation of the method for manufacturing the refractory products of the present invention, the bubble alumina and a first portion of the calcined alumina are dry mixed in a mixer to produce a dry mixture. The first portion of the calcined alumina includes from about 10% to about 60% of the calcined alumina and, preferably, from about 40% to about 60% of the calcined alumina. The optional tempering agent is then mixed with the dry mixture to produce a moistened mixture. This moistened mixture is then combined with a second portion of the fine calcined alumina, the fine hydrated alumina, and the organic binder with mixing to form the pre-pressed mixture. The second portion of the calcined alumina includes from about 90% to about 40% of the calcined alumina and preferably, from about 60% to about 40% of the calcined alumina. The pre-pressed mixture is then pressed into a shape and fired. Optionally, graphite can be added with the fine aluminas.

Mixing is preferably performed in a low shear mixer such as a Lancaster type mixer. However, a high shear mixer can also be used. Typically, the mixing is performed in about 20 minutes whether the mixing is done in a single step or in a sequence of steps, as described above. Where the mixing is preformed in a sequence of steps, as described above, the dry mix step is typically performed in about 2 minutes, the mix step involving the addition of the tempering agent is generally performed in about 4 to 8 minutes. However, as will be apparent to those skilled in the art, shorter and longer mix times can be used.

The pre-pressed mixture can be formed into a shape in a toggle type press or a hydraulic type press. The forming pressure is generally selected at a pressure between about 625 to 1750 psig. However, the forming pressure can be higher or lower depending upon the particular mix utilized. The forming pressure will be selected to ensure that the shape has a pre-fired density of from about 85 pcf to 110 pcf, with from about 90 to 110 pcf being preferred.

Generally, the various embodiments of the method of the present invention can further include the step of curing the pre-pressed mixture, before firing, at a sufficient curing temperature and for a sufficient curing time to ensure that the product has sufficient handling strength to be loaded in a firing kiln.

When the pre-pressed mixture is cured before firing, the typical curing temperature is from about 225° F. to about 300° F., but lower or higher temperatures can be used. Typical curing periods are between about 4 and 12 hours. Those skilled in the art will recognize that the curing time and temperature are related, and that relatively higher curing temperatures will require relatively shorter curing periods, etc.

The firing temperatures typically used in the practice of the present invention can be from about 2750° F. to about 3000° F., while firing times will typically range from about 6 to about 14 hours at or near a top temperature. The top temperature is the temperature at which the shape is to be fired. Firing times of from about 8 to about 12 hours at the top temperature are preferred. However, shorter or longer firing times can be used, particularly with variations in the firing temperature, as is known to those skilled in the art.

During firing, the pre-fired mixture will lose any added tempering agent, any water associated with the hydrated alumina and any water associated with the organic binder. The pre-fired mixture also will lose some, if not all, of the organic binder and the graphite during firing. Those skilled in the art will recognize that upon firing of the composition, the organic binder and the optional graphite will largely burn out of the refractory with only a minor portion remaining as a carbonaceous residue.

The as-fired refractory products of the present invention preferably have an alumina content of at least 98 wt. % and a silica content of less than 1 wt. %. As discussed earlier herein, a low silica content is critical in preventing undesirable decomposition in the presence of corrosive agents such as hydrofluoric acid and/or fluorine gas.

As identified previously, the refractories of the present invention are made partially from a bubble alumina. "Bubble alumina" refers to any of a variety of aluminas which consist of hollow alumina spheres. Such bubble alumina may be made by pouring molten alumina through a stream of high velocity air which produces small, bubble-like, hollow alumina spheres as described for example in U.S. Pat. No. 4,495,301 to Sutor. U.S. Pat. No. 4,495,301 is hereby incorporated herein by reference. The bubble aluminas suitable for use in the present invention include, but are not restricted to, bubble aluminas from Washington Mills Electrominerals Corporation of Niagara Falls, N.Y., sold as Duralum AB.

Calcined alumina refers to an alumina which has been fired to remove any water of hydration. Calcined aluminas preferable for use in the present invention are at least 98.5 wt. % by weight alumina and have a silica content of less than 1 wt. %. It has been found that the surface area of the calcined aluminas can affect the final properties of the refractories of the present invention. The surface area of the calcined alumina can be from about 5 to about 25 $m^2/g$, while a surface area of from about 5 to about 15 $m^2/g$ is particularly preferred. An exemplary satisfactory calcined alumina is A-16 superground calcined alumina, sold by ALCOA. The preferred particle size for the calcined alumina is 325 mesh or less.

The hydrated aluminas preferable for use in the present invention have an loss on ignition ("LOI") of about 35% and a preferred particle size of 325 mesh or less. The hydrated aluminas are at least 98.5 wt. % alumina, as measured after ignition, and have a silica content of less than 1 wt. %, as measured after ignition. It has also been found that the surface area of the hydrated aluminas can affect the final properties of the refractories of the present invention. The surface area of the hydrated alumina can be from about 0.05 to about 10 m²/g, while a surface area of from about 0.10 to about 1.0 m²/g is particularly preferred for the hydrated alumina. Exemplary satisfactory hydrated aluminas are C-31 hydrated alumina and C-710 hydrated alumina, sold by ALCOA. The LOI of about 35% is the value reported by ALCOA regarding the C-31 and C-710 hydrated aluminas and relates to the weight loss the aluminas undergo upon firing.

Where graphite is utilized in the pre-pressed mixture, the preferred particle size for the graphite is 65 mesh or less. An exemplary graphite suitable for use with the present invention is amorphous graphite, grade 9985, from Cummings-Moore Graphite Company of Detroit, Mich.

The organic binders believed suitable for use in the present invention include, but are not limited to, dextrin, starch, modified starch, gums, poysaccharides, carbowax, cellulose, modified cellulose, methyl cellulose, modified methyl cellulose, polyvinyl alcohol, and the like, or combination thereof or solution thereof. Powdered binders are preferred and dextrin powder is particularly preferred.

The pre-pressed mixture may be pressed into any desired shape, such as, for example, brick (3-dimensional rectangular solids), cones, tiles and the like, with brick being preferred.

The room temperature modulus of rupture and the cold crushing strength are measured by a method adapted from ASTM testing methods C 193-84 and C 133-84, respectively. First, a brick having the dimension of about 9" by 4.5" by 2.5" is broken in a 3-point bend test to determine the room temperature modulus of rupture. One-half of the brick is then squared off by cutting away the broken face. The squared sample having a dimension of about 4.5" by 4.5" by 2.5" is then crushed by applying a constant load to the 2.5" brick thickness. The load is applied at the rate of 7,000 lbs/min. until the brick is crushed.

The apparent porosity, apparent specific gravity and bulk density are measured according to ASTM testing method C-830-83.

EXAMPLES

The present invention can be further understood and additional aspects can be discerned from the following illustrative and representative examples. All batches were mixed in a small Lancaster type mixer with the Muller up. All brick were cured at 250° F. for 8 hours to ensure adequate pre-firing handling strength for kiln packing as is standardly known in the art.

EXAMPLE 1

This example illustrates a set of refractory products (Brick 1-4) comprising 75 wt. % of bubble alumina, 20 wt. % of A-16 fine calcined alumina from ALCOA, and 5 wt. % of C-31 fine hydrated alumina from ALCOA. Brick 1 and 2 were pressed from a mixture without graphite. Graphite was then added, and Brick 3 and 4 were pressed from the mixture including graphite. The four bricks were pressed at different forming pressures. The batch size was 25 pounds and the firing temperature was 2810° F. The refractory products compositional make up expressed in wt. %, along with the before-fired properties of the resulting brick, are shown in Table 1. The as-fired properties are listed in Table 1A.

75 wt. % of the Duralum AB bubble alumina and 50% of the 20 wt. % of the A-16 calcined alumina were added to the mixer and dry mixed for 2 minutes. The bubble alumina was composed of particles of less than 4 mesh. The A-16 calcined alumina had a surface area of 8.7 m²/g and was composed of particles of 325 mesh or less.

To the dry mixture was added 3.25 wt. % water and the moistened mixture was mixed for 4 minutes. Next, the remaining 50% of the 20 wt. % of the A-16 calcined alumina, 5 wt. % of the C-31 hydrated alumina, and 2 wt. % of the dextrin were added and mixed for 8 minutes The C-31 hydrated alumina had a surface area of 0.15 m²/g and was composed of particles of 325 mesh or less. The C-31 hydrated had a LOI of about 35 wt. %. Two portions of the mixture were then removed and pressed to form Brick 1 and 2.

Subsequently, 1 wt. % of graphite was added and the resulting mixture was mixed for an additional 4 minutes. Brick 3 and 4 were pressed from the mixture after the addition of the graphite.

The amounts pressed, the forming pressures, and the brick thickness for each of the four bricks are listed in Table 1 along with as-pressed properties.

TABLE 1

| | Brick 1 | Brick 2 | Brick 3 | Brick 4 |
|---|---|---|---|---|
| Component | | | | |
| Bubble Alumina | 75 | 75 | 75 | 75 |
| A-16 Fine Calcined Alumina | 20 | 20 | 20 | 20 |
| C-31 Fine Hydrated Alumina | 5 | 5 | 5 | 5 |
| Fine Graphite | 0 | 0 | 1 | 1 |
| Dextrin | 2 | 2 | 2 | 2 |
| Water | 3.25 | 3.25 | 3.25 | 3.25 |
| Properties | | | | |
| Pounds Pressed | 5.6 | 5.6 | 5.6 | 5.85 |
| Forming Pressure (psig) | 775 | 775 | 875 | 1000 |
| Brick Thickness (inches) | 2.48 | 2.48 | 2.47 | 2.48 |
| Bulk Density After Pressing (pcf) | 96 | 96 | 96 | 100 |

TABLE 1A

| After Fired Properties | Values |
|---|---|
| Bulk Density (pcf) (avg. of Brick 1-4) | 92 |
| Apparent Porosity (%) (avg. of Brick 1-4) | 61.0 |
| Apparent Specific Gravity (avg. of Brick 1-4) | 3.86 |
| Room Temperature Modulus of Rupture (psig) (avg. of Brick 2 and 4) | 460 |
| Cold Crushing Strength (psig) (Brick 1 only) | 890 |

It can be seen from the data in Tables 1 and 1A that a commercially usable, high alumina, low silica refractory product can be prepared with a room temperature modulus of rupture of 460 psig and a cold crushing strength of 890 psig.

EXAMPLE 2

This example illustrates a set of refractory products (Brick 5-8) comprising 75 wt. % of bubble alumina, 20 wt. % of A-16 fine calcined alumina from ALCOA, and 5 wt. % of C-710 fine hydrated alumina from ALCOA. Water was added in two different mixing steps. Before the second addition of water, Brick 5 and 6 were pressed, while Brick 7 and 8 were pressed from the mixture after the second addition of water. The four bricks were pressed at different forming pressures. The batch size was 25 pounds and the firing temperature was 2810° F. The refractory products' compositional make up expressed in wt. %, along with the before-fired properties, are shown in Table 2. The as-fired properties are listed in Table 2A.

75 wt. % of the Duralum AB bubble alumina and 50% of the 20 wt. % of the A-16 calcined alumina were added to the mixer and dry mixed for 2 minutes. The bubble alumina was composed of particles of less than 4 mesh. The A-16 calcined alumina had a surface area of 8.7 m²/g and was composed of particles of 325 mesh or less.

To the dry mixture was added 3.25 wt. % water and the moistened mixture was mixed for 4 minutes. Next, the remaining 50% of the 20 wt. % of the A-16 calcined alumina, 5 wt. % of the C-710 hydrated alumina, and 2 wt. % of the dextrin were added and mixed for 8 minutes. The C-710 hydrated alumina had a surface area of 6-8 m²/g and was composed of particles of 325 mesh or less. The C-710 hydrated alumina had a LOI of about 35 wt. %. Two portions of the mixture were removed and pressed to form Brick 5 and 6.

Subsequently, an additional 0.44 wt. % of water was added, and the resulting mixture was mixed for an additional 4 minutes. Brick 7 and 8 were pressed from the mixture after the addition of the 0.44 wt. % water.

The amounts pressed, the forming pressures, and the brick thickness for each of the fours bricks are listed in Table 2 along with as-pressed properties. The as-fired properties are listed in Table 2A.

TABLE 2

|  | Brick 5 | Brick 6 | Brick 7 | Brick 8 |
|---|---|---|---|---|
| Component |  |  |  |  |
| Bubble Alumina | 75 | 75 | 75 | 75 |
| A-16 Fine Calcined Alumina | 20 | 20 | 20 | 20 |
| C-710 Fine Hydrated Alumina | 5 | 5 | 5 | 5 |
| Dextrin | 2 | 2 | 2 | 2 |
| Water | 3.25 | 3.25 | 3.69 | 3.69 |
| Properties |  |  |  |  |
| Pounds Pressed | 5.6 | 6.2 | 5.6 | 6.2 |
| Forming Pressure (psig) | 950 | 1425 | 825 | 1400 |
| Brick Thickness (inches) | 2.49 | 2.49 | 2.49 | 2.50 |
| Bulk Density After Pressing (pcf) | 96 | 106 | 96 | 105 |

TABLE 2A

| After Fired Properties | Values |
|---|---|
| Bulk Density (pcf) (Brick 7 only) | 90 |
| Apparent Porosity (%) (Brick 7 only) | 63.0 |
| Apparent Specific Gravity (Brick 7 only) | 3.88 |
| Room Temperature Modulus of Rupture (psig) (Brick 7 only) | 210 |

It can be seen from the data in Table 2 and 2A that a high alumina refractory brick with adequate room temperature modulus of rupture can be made from a combination of bubble alumina, calcined alumina and hydrated alumina. However, it can also be seen that the use of a high surface area hydrated alumina resulted in a reduced modulus of rupture, as compared to the brick prepared according to example 1.

EXAMPLE 3

This example illustrates a set of refractory products (Brick 9-12) comprising 75 wt. % of bubble alumina, 20 wt. % of A-16 fine calcined alumina from ALCOA, and 5 wt. % of C-31 fine hydrated alumina from ALCOA. Brick 9 and 10 were pressed from a mixture without graphite. Graphite was then added, and Brick 11 and 12 were pressed from the mixture including graphite. The four bricks were pressed at different forming pressures. The batch size was 25 pounds and the firing temperature was 2810° F. The refractory products compositional make up expressed in wt. %, along with the before-fired properties, are shown in Table 3. The as-fired properties are listed in Table 3A.

75 wt. % of the Duralum AB bubble alumina and 50% of the 20 wt. % of the A-16 calcined alumina were added to the mixer and dry mixed for 2 minutes. The bubble alumina was composed of particles of less than 4 mesh. The A-16 calcined alumina had a surface area of 8.7 m²/g and was composed of particles of 325 mesh or less.

To the dry mixture was added 2.85 wt. % water and the moistened mixture was mixed for 4 minutes. Next, the remaining 50% of the 20 wt. % of the A-16 calcined alumina, the 5 wt. % of the C-31 hydrated alumina, and the 2 wt. % of the dextrin were added and mixed for 8 minutes. The C-31 hydrated alumina had a surface area of 0.15 m²/g and was composed of particles of 325 mesh or less. The C-31 hydrated alumina had a LOI of about 35 wt. %. One portion of the mixture was removed and pressed to form Brick 9.

Subsequently, 1 wt. % of graphite and 0.2 wt. % of Darvan #7 were added and the resulting mixture was mixed for an additional 4 minutes. Darvan #7 is a liquid sodium silicate dispersant available from R. T. Vanderbilt of Norwalk, Conn. Brick 10-12 were pressed from the mixture after the addition of graphite and Darvan #7.

The amounts pressed, the forming pressures, and the brick thickness for each of the four bricks are listed in Table 3, along with certain as-pressed properties.

TABLE 3

|  | Brick 9 | Brick 10 | Brick 11 | Brick 12 |
|---|---|---|---|---|
| Component |  |  |  |  |
| Bubble Alumina | 75 | 75 | 75 | 75 |
| A-16 Fine Calcined Alumina | 20 | 20 | 20 | 20 |

TABLE 3-continued

|  | Brick 9 | Brick 10 | Brick 11 | Brick 12 |
|---|---|---|---|---|
| C-31 Fine Hydrated Alumina | 5 | 5 | 5 | 5 |
| Fine Graphite | 0 | 1 | 1 | 1 |
| Darvan #7 | 0 | 0.2 | 0.2 | 0.2 |
| Dextrin | 2 | 2 | 2 | 2 |
| Water | 2.85 | 2.85 | 2.85 | 2.85 |
| Properties |  |  |  |  |
| Pounds Pressed | 5.6 | 5.6 | 5.85 | 5.85 |
| Forming Pressure (psig) | 900 | 875 | 1000 | 1000 |
| Brick Thickness (inches) | 2.50 | 2.49 | 2.49 | 2.49 |
| Bulk Density After Pressing (pcf) | 95 | 96 | 100 | 100 |

TABLE 3A

| After Fired Properties | Values |
|---|---|
| Bulk Density (pcf) (avg. of Brick 10–12) | 92 |
| Apparent Porosity (%) (avg. of Brick 10–12) | 61.0 |
| Apparent Specific Gravity (avg. of Brick 10–12) | 3.84 |
| Room Temperature Modulus of Rupture (psig) (Brick 12 only) | 300 |

It can be seen from the data in Tables 3 and 3A that a commercially usable, high alumina, refractory product can be made with bubble alumina, calcined alumina and hydrated alumina. The 2.85 wt. % water used in this mix showed that the addition of less water, as compared to Example 1, had a somewhat adverse effect on the room temperature modulus of rupture of the brick. Also, the addition of the dispersant, Darvan #7, did not result in an improved brick.

EXAMPLE 4

This example illustrates a set of refractory products (Brick 13-16) comprising 75 wt. % of bubble alumina, 15 wt. % of A-16 fine calcined alumina from ALCOA, and 10 wt. % of C-31 fine hydrated alumina from AL-COA. Brick 13-15 were pressed from a mixture without graphite. Graphite was then added, and Brick 16 was pressed from the mixture including graphite. The four bricks were pressed at different forming pressures. The batch size was 25 pounds and the firing temperature was 2810° F. The refractory products' compositional make up expressed in wt. %, along with the before-fired properties, are shown in Table 4. The as-fired properties are listed in Table 4A.

75 wt. % of the Duralum AB bubble alumina and 2 wt. % of the dextrin were added to the mixer and dry mixed for 2 minutes. The bubble alumina was composed of particles of less than 4 mesh.

To the dry mixture was added 3 wt. % water and the moistened mixture was mixed for 4 minutes. Next, 15 wt. % of the A-16 calcined alumina and 10 wt. % of the C-31 hydrated alumina were added and mixed for 8 minutes. The A-16 calcined alumina had a surface area of 8.7 m²/g and was composed of particles of 325 mesh or less. The C-31 hydrated alumina had a surface area of 0.15 m²/g and was composed of particles of 325 mesh or less. The C-31 hydrated had a LOI of about 35 wt. %. Three portions of the mixture before the graphite addition were removed and pressed to form Brick 13-15.

Subsequently, 1 wt. % of graphite was added and the resulting mixture was mixed for an additional 2 minutes. Brick 16 was pressed from the mixture after the addition of the graphite.

The amounts pressed, the forming pressures, and the brick thickness for each of the four bricks are listed in Table 4, along with as-pressed properties.

TABLE 4

|  | Brick 13 | Brick 14 | Brick 15 | Brick 16 |
|---|---|---|---|---|
| Component |  |  |  |  |
| Bubble Alumina | 75 | 75 | 75 | 75 |
| A-16 Fine Calcined Alumina | 15 | 15 | 15 | 15 |
| C-31 Fine Hydrated Alumina | 10 | 10 | 10 | 10 |
| Fine Graphite | 0 | 0 | 0 | 1 |
| Dextrin | 2 | 2 | 2 | 2 |
| Water | 3 | 3 | 3 | 3 |
| Properties |  |  |  |  |
| Pounds Pressed | 5.6 | 5.85 | 6.2 | 5.85 |
| Forming Pressure (psig) | 875 | 1000 | 1250 | 1000 |
| Brick Thickness (inches) | 2.49 | 2.49 | 2.5 | 2.5 |
| Bulk Density After Pressing (pcf) | 96 | 100 | 105 | 99 |

TABLE 4A

| After Fired Properties | Values |
|---|---|
| Bulk Density (pcf) (avg. of Brick 14–16) | 94 |
| Apparent Porosity (%) (avg. of Brick 14–16) | 61.0 |
| Apparent Specific Gravity (avg. of Brick 14–16) | 3.88 |
| Room Temperature Modulus of Rupture (psig) (avg. of Brick 14–16) | 400 |

It can be seen from the data in Tables 4 and 4A that a high alumina brick can be prepared from a greater amount of hydrated alumina relative to calcined alumina, as compared to the bricks in Examples 1 and 3. The higher amount of hydrated alumina appears to have little if any effect on the room temperature modulus of rupture of Brick 14-16, as compared to Brick 3 of Example 1, or as compared to Brick 10 of Example 3.

EXAMPLE 5

This example illustrates a set of refractory products (Brick 17-20) comprising 75 wt. % of bubble alumina, 10 wt. % of A-16 fine calcined alumina from ALCOA, and 15 wt. % of C-31 fine hydrated alumina from AL-COA. The four bricks were pressed at different forming pressures. The batch size was 25 pounds and the firing temperature was 2810° F. The refractory products compositional make up expressed in wt. %, along with the before-fired properties, are shown in Table 5. The as-fired properties are listed in Table 5A.

75 wt. % of the Duralum AB bubble alumina and 2 wt. % of the dextrin were added to the mixer and dry mixed for 2 minutes. The bubble alumina was composed of particles of less than 4 mesh.

To the dry mixture was added 3 wt. % water and the moistened mixture was mixed for 4 minutes. Next, 10 wt. % of the A-16 calcined alumina and 15 wt. % of the C-31 hydrated alumina were added and mixed for 8 minutes. Brick 17-20 were pressed from the resulting mixture. The A-16 calcined alumina had a surface area of 8.7 m²/g and was composed of particles of 325 mesh or less. The C-31 hydrated alumina had a surface area of 0.15 m²/g and was composed of particles of 325 mesh or less. The C-311 hydrated had a LOI of about 35 wt. %.

The amounts pressed, and the forming pressures, are listed in Table 5, along with certain as-pressed properties.

TABLE 5

| Component | Brick 17 | Brick 18 | Brick 19 | Brick 20 |
|---|---|---|---|---|
| Bubble Alumina | 75 | 75 | 75 | 75 |
| A-16 Fine Calcined Alumina | 10 | 10 | 10 | 10 |
| C-31 Fine Hydrated Alumina | 15 | 15 | 15 | 15 |
| Dextrin | 2 | 2 | 2 | 2 |
| Water | 3 | 3 | 3 | 3 |
| Properties |  |  |  |  |
| Pounds Pressed | 5.6 | 5.85 | 6.2 | 6.2 |
| Forming Pressure (psig) | 1000 | 1050 | 1500 | 1500 |
| Brick Thickness (inches) | — | 2.49 | 2.49 | 2.49 |
| Bulk Density After Pressing (pcf) | — | 100 | 106 | 106 |

TABLE 5A

| After Fired Properties | Values |
|---|---|
| Bulk Density (pcf) (Brick 18 only) | 95 |
| Apparent Porosity (%) (Brick 18 only) | 62.0 |
| Apparent Specific Gravity (Brick 18 only) | 3.88 |

EXAMPLE 6

This example illustrates a set of refractory products (Brick 21-24) comprising 75 wt. % of bubble alumina, 15 wt. % of A-16 fine calcined alumina from ALCOA, and 10 wt. % of C-31 fine hydrated alumina from ALCOA. Brick 21 and 22 were pressed from a mixture without the addition of a gum (an organic thickener). The gum was then added, and Brick 23 and 24 were pressed from the mixture including the gum. The four bricks were pressed at different forming pressures. The batch size was 25 pounds and the firing temperature was 2810° F. The refractory products compositional make up expressed in wt. %, along with the before-fired properties, are shown in Table 6. The as-fired properties are listed in Table 6A. The mesh size break down of component solids utilized in making the refractory products of this example, along with the average as-fired chemical analysis of Brick 21-24, are listed in Table 6B.

75 wt. % of the Duralum AB bubble alumina and 4.4 wt. % of the 40% dextrin solution were added to the mixer and mixed for 2 minutes. The bubble alumina was composed of particles of less than 4 mesh.

To the mixture was added 15 wt. % of the A-16 calcined alumina and 10 wt. % of the C-31 hydrated alumina and the mixture was mixed for 8 minutes. The A-16 calcined alumina had a surface area of 8.7 m²/g and was composed of particles of 325 mesh or less. The C-31 hydrated alumina had a surface area of 0.15 m²/g and was composed of particles of 325 mesh or less. The C-31 hydrated had a LOI of about 35 wt. %. Two portions of the mixture were removed and pressed to form Brick 21 and 22.

Subsequently, 0.36 wt. % of Amber Gum 3021 was added and the resulting mixture was mixed for an additional 8 minutes. Amber gum 3021 is an organic binder and thickening agent available from Aqualon Corporation of Wilmington, Del. Brick 23 and 24 were pressed from the mixture after the addition of Amber Gum.

The amounts pressed, the forming pressures, and the brick thickness for each of the four bricks, are listed in Table 6, along with certain as-pressed properties.

TABLE 6

| Component | Brick 21 | Brick 22 | Brick 23 | Brick 24 |
|---|---|---|---|---|
| Bubble Alumina | 75 | 75 | 75 | 75 |
| A-16 Fine Calcined Alumina | 15 | 15 | 15 | 15 |
| C-31 Fine Hydrate Alumina | 10 | 10 | 10 | 10 |
| 40% Dextrin Solution | 4.4 | 4.4 | 4.4 | 4.4 |
| Amber Gum 3021 | 0 | 0 | 0.36 | 0.36 |
| Properties |  |  |  |  |
| Pounds Pressed | 5.85 | 6.2 | 5.85 | 6.2 |
| Forming Pressure (psig) | 1075 | 1450 | 1000 | 1375 |
| Brick Thickness (inches) | 2.48 | 2.49 | 2.48 | 2.48 |
| Bulk Density After Pressing (pcf) | 100 | 106 | 100 | 106 |

TABLE 6A

| After Fired Properties | Values |
|---|---|
| Bulk Density (pcf) (avg. of Brick 21-24) | 95 |
| Apparent Porosity (%) (avg. of Brick 21-24) | 60.0 |
| Apparent Specific Gravity (avg. of Brick 21-24) | 3.87 |
| Room Temperature Modulus of Rupture (psig) (avg. of Brick 22-24) | 590 |
| Cold Crushing Strength (psig) (Brick 21 only) | 500 |

TABLE 6B

| Screen Analysis in Mesh Size | | | % |
|---|---|---|---|
| −6 | +10 | Mesh | 25 |
| −10 | +28 | Mesh | 24 |
| −28 | +65 | Mesh | 11 |
| −65 | +150 | Mesh | 5 |
| −150 | | Mesh | 35 |
| Chemical Analysis (avg. of all 4 Brick) | | | |
| Alumina ($Al_2O_3$) | | | 98.73 |
| Silica ($SiO_2$) | | | 00.88 |
| Titania ($TiO_2$) | | | 00.02 |
| Iron Oxide ($Fe_2O_3$) | | | 00.06 |
| Lime (CaO) | | | 00.06 |
| Magnesia (MgO) | | | 00.01 |
| Soda ($Na_2O$) | | | 00.08 |
| Potash ($K_2O$) | | | 00.01 |
| Total | | | 99.85 |

It can be seen from the data in Tables 6, 6A and 6B that a high alumina, refractory product can be prepared using a dextrin solution, i.e., an organic binder solution, having a room temperature modulus of rupture of 590 psig and a cold crushing strength of 500 psig. Brick 21 also has an as-fired alumina content of 98.73 wt. % and a silica content of 0.88 wt. %. The addition of Amber gum 3021 did not improve the refractory properties.

EXAMPLE 7

This example illustrates a set of refractory products (Brick 25-28) comprising 75 wt. % of bubble alumina, 15 wt. % of A-16 fine calcined alumina from ALCOA, and 10 wt. % of C-31 fine hydrated alumina from ALCOA. The organic binder used in this example was a 17% aqueous solution of polyvinyl alcohol. The polyvinyl alcohol solution was added in three different additions. Brick 25 was pressed from a mixture after two additions of the polyvinyl alcohol solution. After the third and final addition of the polyvinyl alcohol solution, Brick 26-28 were pressed. The four bricks were pressed at different forming pressures. The batch size was 25 pounds and the firing temperature was 2810° F. The refractory products' compositional make up expressed in wt. %, along with the before-fired properties, are shown in Table 7. The refractories' as-fired properties of Brick 26 are shown in Table 7A.

75 wt. % of the Duralum AB bubble alumina and 3.5 wt. % of the 17% polyvinyl alcohol solution were added to the mixer and mixed for 4 minutes. The bubble alumina was composed of particles of less than 4 mesh. Polyvinyl alcohol is an organic binder and thickening agent which was added to water to form the 17% solution.

To the mixture was added 15 wt. % of the A-16 calcined alumina and 10 wt. % of the C-31 alumina and the mixture was mixed for 8 minutes. The A-16 calcined alumina had a surface area of 8.7 m²/g and was composed of particles of 325 mesh or less. The C-31 hydrated alumina had a surface area of 0.15 m²/g and was composed of particles of 325 mesh or less. The C-31 hydrated had a LOI of about 35 wt. %. Next, 0.3 wt. % of the 17% polyvinyl alcohol solution was added and the mixture mixed for an additional 4 minutes. One portion of the mixture was removed and pressed to form Brick 25.

Subsequently, 0.4 wt. % of the 17% polyvinyl alcohol solution was added and the resulting mixture was mixed for an additional 4 minutes. Brick 26-28 were pressed from the mixture after the final addition of the polyvinyl alcohol solution.

The amounts pressed, the forming pressures, and the brick thickness for each of the four bricks are listed in Table 7, along with certain as-pressed properties.

TABLE 7

| Component | Brick 25 | Brick 26 | Brick 27 | Brick 28 |
|---|---|---|---|---|
| Bubble Alumina | 75 | 75 | 75 | 75 |
| A-16 Calcined Alumina | 15 | 15 | 15 | 15 |
| C-31 Hydrate Alumina | 10 | 10 | 10 | 10 |
| Polyvinyl Alcohol Solution (17%) | 3.8 | 4.2 | 4.2 | 4.2 |
| Properties | | | | |
| Pounds Pressed | 5.85 | 5.85 | 6.2 | 5.6 |
| Forming Pressure (psig) | 1250 | 1000 | 1300 | 850 |
| Brick Thickness (inches) | 2.47 | 2.48 | — | 2.48 |
| Bulk Density After Pressing (pcf) | 101 | 100 | — | 96 |

TABLE 7A

| After Fired Properties | Values |
|---|---|
| Bulk Density (pcf) (Brick 26 only) | 93 |
| Apparent Porosity (%) (Brick 26 only) | 62.0 |
| Apparent Specific Gravity (Brick 26 only) | 3.86 |

The addition of polyvinyl alcohol resulted in brick with similar properties to the brick made in Example 6.

EXAMPLE 8

This example illustrates a refractory product (Brick 29) comprising 75 wt. % of bubble alumina, 15 wt. % of A-16 fine calcined alumina from ALCOA, and 10 wt. % of C-31 fine hydrated alumina from ALCOA pressed at different forming pressures. The batch size was 1500 pounds and the firing temperature was between 2810° F. and 2850° F. in a commercial kiln. The refractory products compositional make up expressed in wt. %, along with the before and after fired properties, are shown in Table 8.

75 wt. % of the Duralum AB bubble alumina and 2 wt. % of the dextrin were added to the mixer and dry mixed for 2 minutes. The bubble alumina was composed of particles of less than 4 mesh.

To the dry mixture was added 3.0 wt. % water and the moistened mixture was mixed for 4 minutes. Next, 15 wt. % of the A-16 calcined alumina, 10 wt. % of the C-31 hydrated alumina and 1 wt. % of graphite were added and the mixture was mixed for 8 minutes. The A-16 calcined alumina had a surface area of 8.7 m²/g and was composed of particles of 325 mesh or less. The C-31 hydrated alumina had a surface area of 0.15 m²/g and was composed of particles of 325 mesh or less. The C-31 hydrated and a LOI of about 35 wt. %.

Brick 29 was pressed from the resulting mixture. The before-fired and as-fired properties, along with the compositional make up of Brick 29, are listed in Table 8.

TABLE 8

| Component | Brick 29 |
|---|---|
| Bubble Alumina | 75 |
| A-16 Fine Calcined Alumina | 15 |
| C-31 Fine Hydrate Alumina | 10 |
| Dextrin | 2 |
| Graphite | 1 |
| Properties | |
| Bulk Density After Pressing (pcf) | 94 |
| Bulk Density after Firing (pcf) | 89 |
| Apparent Porosity (%) | 63.4 |
| Apparent Specific Gravity | 3.83 |
| Room Temperature Modulus of Rupture (psig) | 320 |
| Cold Crushing Strength (psig) | 810 |
| % Linear Change at 3140° F. | −0.2 |
| % Volume Change at 3140° F. | −0.7 |

The data in Table 8 showed that dry mixing a powdered organic binder with the bubble alumina resulted in the formation of a superior, high alumina, refractory brick. The data showed Brick 29 to have a room temperature modulus of rupture of 320 psig and a cold crushing strength of 810 psig. Brick 29 also had a low linear change after heating to 3140° F. of −0.2% and a low volume change of −0.7% after heating to 3140° F.

As is apparent from the data in all of the Tables of the present invention, that commercially usable, high alumina, low silica, corrosive resistant, insulating brick can be made from about 50 wt. % to about 80 wt. % of a bubble alumina, from about 10 wt. % to about 30 wt. % of a calcined alumina, and from about 5 wt. % to about 20 wt. % of a hydrated alumina. The resulting refractory products of the present invention have an alumina content of at least 98 wt. % and a silica content of less than 1 wt. % and cold crushing strength of at least 200 psig. Such refractories will have improved resistance to HF and fluorine gases compared to insulating brick having higher silica contents.

It is contemplated, and will be apparent to those skilled in the art from the foregoing descriptions and accompanying tables, that variations and/or modifications of the disclosed invention may be made without departure from the invention. Accordingly, it is expressly intended that the foregoing descriptions and accompanying tables are illustrative of a preferred embodiment only, not limiting, and that the true spirit and scope of the present invention be determined by reference to the appended claims.

What is claimed is:

1. A method for making a high alumina, low silica, corrosion resistant, insulating refractory product comprising the steps of:
   (a) mixing ingredients consisting essentially of about 50 wt. % to about 80 wt. % of a bubble alumina, about 10 wt. % to about 30 wt % of a calcined alumina, about 5 wt. % to about 20 wt. % of a hydrated alumina, and about 1 wt. % to about 5 wt. % of an organic binder in a mixer to produce a pre-pressed mixture;
   (b) pressing said pre-pressed mixture into a shape at a sufficient forming pressure such that said shape has a pre-fired density of from about 90 pcf to about 105 pcf; and
   (c) firing said shape at a sufficient temperature and for a sufficient time to form said product having a cold crushing strength of at least 200 psig.

2. The method of claim 1, wherein said ingredients further consist essentially of about 1 wt. % to about 5 wt. % of a tempering agent.

3. The method of claim 2, wherein the said mixing step further comprises the steps of:
   (i) first mixing said bubble alumina and said binder to produce a first mixture;
   (ii) adding said tempering agent to said first mixture to form a moistened mixture; and
   (iii) combining said moistened mixture with said calcined alumina and said hydrated alumina to produce said pre-pressed mixture.

4. The method of claim 2, wherein said mixing step further comprises the steps of:
   (i) dry mixing said bubble alumina and from about 10% to about 60% of said calcined alumina to produce a dry mixture;
   (ii) adding said tempering agent to said dry mixture to form a moistened mixture; and
   (iii) combining said moistened mixture with from about 90% to about 40% of said calcined alumina, said hydrated alumina, and said binder to produce said pre-pressed mixture.

5. The method or claim 1, wherein said ingredients further consist essentially of about 0.5 wt. % to about 1.5 wt. % of a graphite.

6. The method of claim 1, wherein said firing temperature is from about 2750° F. to about 3000° F.

7. The method of claim 1, wherein said product has an as-fired, bulk density of from about 80 pcf to about 95 pcf, an as-fired porosity of from about 55 wt. % to about 65%, an as-fired room temperature modulus of rupture of at least 200 psig, and an as-fired cold crushing strength of at least 200 psig.

8. The method of claim 1, wherein said bubble alumina has an alumina content of at least 98 wt. % and a silica content of less than 1 wt. %, said calcined alumina has a surface area from about 5 to about 25 m²/g, a particle size of 325 mesh or less, an alumina content of at least 98.5 wt. % and a silica content of less than 1 wt. %, and said hydrated alumina has a surface area of from about 0.05 to about 10.0 m²/g, a particle size of 325 mesh or less, and an after ignition alumina content of at least 98.5 wt. % and a silica content of less than 1 wt. %.

9. A method for making a high alumina, low silica, corrosion resistant, insulating refractory product comprising the steps of:
   (a) mixing ingredients consisting essentially of about 50 wt. % to about 80 wt. % of a bubble alumina, about 1 wt. % to about 5 wt. % of an organic binder, about 1 wt. % to about 5 wt. % of a tempering agent, about 10 wt. % to about 30 wt. % of a calcined alumina and about 5 wt. % to about 20 wt. % of a hydrated alumina, said mixing comprising the steps of:
      (i) mixing said bubble alumina and said organic binder in a mixer to produce a first mixture;
      (ii) adding said tempering agent to said first mixture to form a moistened mixture; and
      (iii) combining said moistened mixture with said calcined alumina and said hydrated alumina to produce a pre-pressed mixture;
   (b) pressing said pre-pressed mixture into a shape at a sufficient forming pressure such that said shape has a pre-fired density of from about 90 pcf to about 105 pcf; and
   (c) firing said shape at a sufficient temperature and for a sufficient time to form said product having a cold crushing strength of at least 200 psig.

10. A method for making a high alumina, low silica, corrosion resistant, insulating refractory product comprising the steps of:
    (a) mixing ingredients consisting essentially of about 50 wt. % to about 80 wt. % of a bubble alumina, about 10 wt. % to about 30 wt. % of a calcined alumina, about 1 wt. % to about 5 wt. % of a tempering agent, about 5 wt. % to about 20 wt. % of a hydrated alumina, and about 1 wt. % to about 5 wt. % of an organic binder, said mixing comprising the steps of:
       (i) dry mixing said bubble alumina and a first portion of said calcined alumina in a mixer to produce a dry mixture, said first portion comprising from about 10% to about 60% of said calcined alumina;
       (ii) adding said tempering agent to said dry mixture to form a moistened mixture; and
       (iii) combining said moistened mixture with a second portion of said calcined alumina, said hydrated alumina, and said organic binder to produce a pre-pressed mixture, said second portion of calcined alumina comprising from about 90% to about 40% of said calcined alumina;
    (b) pressing said pre-pressed mixture into a shape at a sufficient forming pressure such that said shape has a pre-fired density of from about 90 pcf to about 105 pcf; and
    (c) firing said shape at a sufficient temperature and for a sufficient tine to form said product having a cold crushing strength of at least 200 psig.

* * * * *